(12) United States Patent
Carr et al.

(10) Patent No.: US 7,551,295 B2
(45) Date of Patent: Jun. 23, 2009

(54) DISPLACEMENT SENSOR

(75) Inventors: Dustin Wade Carr, Albuquerque, NM (US); James Gilbert Helm, Harrisburg, PA (US)

(73) Assignee: Symphony Acoustics, Inc., Rio Rancho, NM (US)

(*) Notice: Subject to any disclaimer, the term of this patent is extended or adjusted under 35 U.S.C. 154(b) by 202 days.

(21) Appl. No.: 11/421,593

(22) Filed: Jun. 1, 2006

(65) Prior Publication Data

US 2007/0279640 A1    Dec. 6, 2007

(51) Int. Cl.
*G01B 11/02* (2006.01)

(52) U.S. Cl. ..................................... 356/506

(58) Field of Classification Search ................. 356/519, 356/506
See application file for complete search history.

(56) References Cited

U.S. PATENT DOCUMENTS

| | | | |
|---|---|---|---|
| 3,729,261 A * | 4/1973 | Sandercock | 356/454 |
| 4,014,614 A * | 3/1977 | Sandercock | 356/454 |
| 4,983,824 A | 1/1991 | Saaski et al. | |
| 5,039,201 A * | 8/1991 | Liu | 359/589 |
| 5,128,537 A | 7/1992 | Halg | |
| 5,589,689 A | 12/1996 | Koskinen | |
| 5,751,427 A * | 5/1998 | de Groot | 356/507 |
| 5,831,262 A | 11/1998 | Greywall et al. | |
| 5,909,280 A | 6/1999 | Zavracky | |
| 6,321,010 B1 | 11/2001 | Walker et al. | |
| 6,483,619 B1 | 11/2002 | Greywall | |
| 6,567,572 B2 | 5/2003 | Degertekin et al. | |
| 6,747,741 B1 * | 6/2004 | Kleinschmidt | 356/454 |
| 6,765,679 B2 * | 7/2004 | Ducellier et al. | 356/491 |
| 2003/0020926 A1 * | 1/2003 | Miron | 356/519 |
| 2003/0038949 A1 | 2/2003 | Degertekin et al. | |
| 2003/0184867 A1 * | 10/2003 | Clark | 359/629 |
| 2003/0202799 A1 * | 10/2003 | Zhou et al. | 398/177 |
| 2004/0099799 A1 | 5/2004 | Shinzou | |
| 2004/0130728 A1 | 7/2004 | Degertekin et al. | |
| 2004/0156085 A1 * | 8/2004 | Brunfeld et al. | 359/237 |
| 2005/0018541 A1 | 1/2005 | Johansen et al. | |
| 2005/0105098 A1 | 5/2005 | Johansen et al. | |

OTHER PUBLICATIONS

Sagberg, et al., Optical Microphone Based on a Modulated Diffractive Lens, IEEE Photonics Technology Letters, vol. 15, No. 10, Oct. 2003, pp. 1431-1433.
Office Action from U.S. Appl. No. 11/366,730 dated Nov. 28, 2007.

* cited by examiner

*Primary Examiner*—Tarifur Chowdhury
*Assistant Examiner*—Jonathon D Cook
(74) *Attorney, Agent, or Firm*—DeMont & Breyer LLC (57) ABSTRACT

An apparatus and method for detecting multiple beams from a beamsplitter is disclosed. Some embodiments of the present invention are particularly well-suited for use in microphones, high-sensitivity pressure sensors, vibration sensors, and accelerometer applications. Some embodiments of the present invention generate a differential electrical output signal that is based on multiple detected optical signals. The differential output signal is generated in response to an environmental stimulus, such as a pressure differential or incident acoustic energy. In accordance with the illustrative embodiment, an optical displacement sensor redirects the transmitted beam back through the optically-resonant cavity with an angular offset. Due to the angular offset, the redirected beam (i.e., retransmitted beam) transits the cavity with an intra-cavity path length that corresponds to substantially full transmittance of the retransmitted beam in the absence of the environmental stimulus.

25 Claims, 7 Drawing Sheets

DISPLACEMENT SENSOR

FIELD OF THE INVENTION

The present invention relates to displacement sensors in general, and, more particularly, to microphones.

BACKGROUND OF THE INVENTION

Displacement sensors, such as microphones and pressure sensors, are well-known in the prior art. Displacement sensors based on capacitive, impedance, and optical measurements have been developed. Optical displacement sensors are particularly attractive because they overcome many of the limitations of capacitive and impedance measurement techniques, such as low sensitivity, the need for high-voltage biasing, poor electrical isolation, or response nonlinearities.

Optical-displacement sensors known in the prior art operate by detecting light that is reflected and/or transmitted by an optical element that changes its reflectivity and/or transmissivity in response to an environmental stimulus, such as pressure differential, sound, vibration, etc. The detected light is converted into an electrical signal. This signal is a function of the reflectivity and/or transmissivity of the optical element, and, therefore, a function of the stimulus as well.

It can be advantageous to detect the light that is both reflected and transmitted from the optical element. For example, a differential signal based on the optical energy in the two beams can reduce the negative impact of source noise, shot noise, etc., on the output signal. Prior art approaches tend to be complex and costly to implement, however.

An optical displacement sensor that generates an output with reduced cost and complexity would, therefore, be a significant advance in the art.

SUMMARY OF THE INVENTION

The present invention enables the optical detection of a pressure differential without some of the costs and disadvantages for doing so in the prior art. For example, some embodiments of the present invention are particularly well-suited for use in microphones, high-sensitivity pressure sensors, vibration sensors, and accelerometer applications.

Some embodiments of the present invention generate a differential electrical output signal that is based on multiple detected optical signals. The differential output signal is generated in response to an environmental stimulus, such as a pressure differential or incident acoustic energy.

Like the prior art, the differential output signal is based on detected optical beams that are both transmitted and reflected by an optically-resonant cavity—but some embodiments of the present invention are advantageous in that they exhibit reduced complexity and/or cost as compared to prior art displacement sensors.

In accordance with the illustrative embodiment, an optical displacement sensor redirects the transmitted beam back through the optically-resonant cavity with an angular offset. Due to the angular offset, the redirected beam (i.e., retransmitted beam) transits the cavity with an intra-cavity path length that corresponds to substantially full transmittance of the retransmitted beam in the absence of the environmental stimulus.

The reflected beam and the retransmitted beam, therefore, are detected by photodetectors located on the same side of the optically-resonant cavity. In some embodiments of the present invention, the photodetectors are co-located on a single printed circuit board. In some embodiments of the present invention, all electrical components of the displacement sensor are co-located on a single printed circuit board. In some embodiments of the present invention, the photodetectors are monolithically-integrated.

An embodiment of the present invention comprises: a beamsplitter for receiving optical energy and distributing the optical energy into a first beam and a second beam, wherein the path of the second beam through the beamsplitter has a first intra-cavity path length; and a director for receiving one of the first beam and the second beam and providing a third beam, wherein the third beam comprises at least a portion of the optical energy of the received one of the first beam and second beam, and wherein at least a portion of the third beam transits the cavity, and wherein the path of the third beam through the beamsplitter has a second intra-cavity path length.

DETAILED DESCRIPTION

The following terms are defined for use in this Specification, including the appended claims:

Fabry-Perot etalon means an optically-resonant cavity formed by two substantially parallel and substantially flat surfaces that are separated by a cavity-length, wherein the cavity-length is fixed.

Fabry-Perot interferometer means an optically-resonant cavity formed by two substantially parallel and substantially flat surfaces that are separated by a cavity-length, wherein the cavity-length is not fixed. Examples include arrangements of plates wherein the cavity-length is controllably-varied using an actuator, as well as arrangements wherein the cavity-length can vary in response to a stimulus, such as incident acoustic energy.

Cavity-length means the instantaneous separation between two substantially parallel and substantially flat surfaces that form an optically-resonant cavity. Cavity-length is fixed in the case of an etalon. Cavity-length is variable in the case of an interferometer, such as a Fabry-Perot interferometer.

Reflected means reflected externally to an element. A beam reflected by an element, for example, undergoes a change in propagation direction, due to interaction with the element, of at least 90 degrees. It does NOT mean energy that reflects internally within the element. For example, reflected energy from an optically-resonant cavity means light reflected away from a surface of the cavity, not light reflecting between the two surfaces that form the cavity.

Transmitted means not reflected externally to or absorbed by an element. A transmitted beam undergoes a change in propagation direction of less than 90 degrees after interaction with the element. Examples of transmitted beams include, without limitation: a light beam that passes completely through a lens, dielectric layer, or material; a light beam that is refracted by a prism; and, light that passes through at least one surface that forms an optically-resonant cavity.

Reflective-surface means a surface that reflects a significant amount of optical energy at the wavelength or wavelengths suitable for an application.

Figure 1:
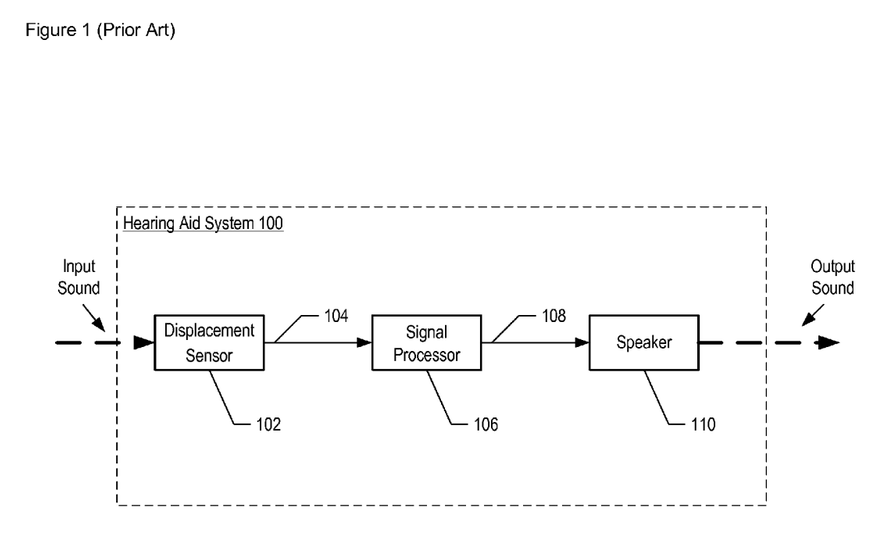
FIG. 1 depicts a schematic diagram of a prior-art hearing aid.

FIG. 1 depicts a schematic diagram of a prior-art hearing aid, as described in U.S. patent application Ser. No. 11/366,730, filed Mar. 2, 2006, which is incorporated by reference herein. Hearing aid system 100 comprises displacement sensor 102, signal processor 106, and speaker 110. Hearing aid system 100 receives input sound (i.e., acoustic energy), conditions the received sound, and provides output sound to the ear of a user.

Displacement sensor 102 is an optical microphone. It provides sensor signal 104 to signal processor 106, wherein the characteristics of sensor signal 104 are based on input sound received by displacement sensor 102.

Signal processor 106 is a processing system that receives sensor signal 104 and performs signal processing. Signal processor 106 comprises an analog-to-digital converter, a digital signal processor, and a digital-to-analog converter. Signal processor 106 provides electrical signal 108 to speaker 110, wherein electrical signal 108 is conditioned to provide:

i. enhanced signal strength; or
  ii. improved signal clarity; or
  iii. reduced signal noise; or
  iv. providing a directionally-adapted signal; or
  v. any combination of i, ii, iii, and iv.

Speaker 110 is an acoustic transducer for converting an electrical signal into acoustic energy.

Figure 2:
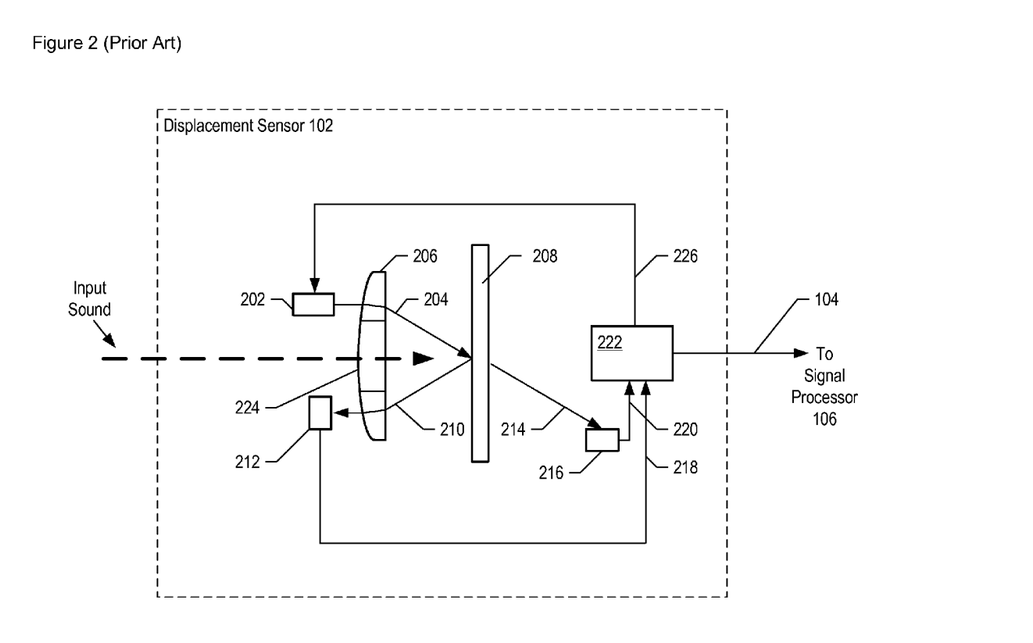
FIG. 2 depicts a prior-art displacement sensor.

FIG. 2 depicts a prior-art displacement sensor. Prior-art displacement sensor 102 comprises source 202, lens 206, Fabry-Perot interferometer 208, detector 212, detector 216, and processor 222. Displacement sensor 102 converts received acoustic energy into sensor signal 104 and provides sensor signal 104 to signal processor 106.

Source 202 comprises a variable current source and a vertical-cavity surface-emitting laser (VCSEL), which emits input beam 204. Input beam 204 is a beam of monochromatic light that includes the interferometer's operating wavelength, $\lambda_1$. The spectral-width of the monochromatic light is typically less than one (1) nanometer. Source 202 emits input beam 204 when the VCSEL is energized with an electric current. Source 202 is tunable over the range of 830 nanometers (nm) to 860 nm.

Lens 206 is a plano-convex lens that is suitable for collimating light emitted by source 202. Lens 206 includes access-hole 224, which facilitates the propagation of acoustic energy toward Fabry-Perot interferometer 208. Lens 206 is aligned to source 202 such that the output of source 202 is received off the central axis of lens 206. Lens 206 collimates the output of source 202 into input beam 204 and directs input beam 204 toward the focal point of lens 206. Lens 206 also receives reflected beam 210 from Fabry-Perot interferometer 208 and focuses the optical energy of reflected beam 210 toward detector 212. The configuration of lens 206, with respect to source 202, Fabry-Perot interferometer 208, and detector 212, is often referred to as a "pupil-division" configuration.

Fabry-Perot interferometer 208 is a variable-reflectivity optical element that comprises two partially-reflective surfaces that are physically separated from one another. The two surfaces define an optically-resonant cavity, which is characterized by a cavity length. Fabry-Perot interferometer 208 receives input beam 204 and splits it into reflected beam 210 and transmitted beam 214. The ratio of optical energy in reflected beam 210 and transmitted beam 214 is a function of the cavity length of Fabry-Perot interferometer 208, and the wavelength, $\lambda_1$, of input beam 204.

The cavity length of Fabry-Perot interferometer 208 is variable. In particular, one surface of Fabry-Perot interferometer 208 is located on a movable membrane that moves in response to receiving acoustic energy. The cavity length of Fabry-Perot interferometer 208 is, therefore, a function of the received acoustic energy. And, as a consequence, the ratio of optical energy in reflected beam 210 and transmitted beam 214 is a function of received acoustic energy.

Detectors 212 and 216 are photodetectors suitable for detecting the light output by source 202. Each of detectors 212 and 216 measure the intensity of the light that is incident on it and transmits an electrical signal indicative of that intensity to processor 222. Detector 212 receives reflected beam 210 and detector 216 receives transmitted beam 214.

Controller 222 is a general-purpose processor that is capable of reading data and instructions from a memory, of executing instructions, of writing data to a memory, of receiving data from detectors 212 and 216, and of providing sensor signal 104 to signal processor 106. Controller 222 receives electrical signals 218 and 220 and performs signal processing based on those signals. Controller 222 also includes circuitry for providing feedback signal 226 to source 202 to control the wavelength of the light output by source 202.

Figure 3:
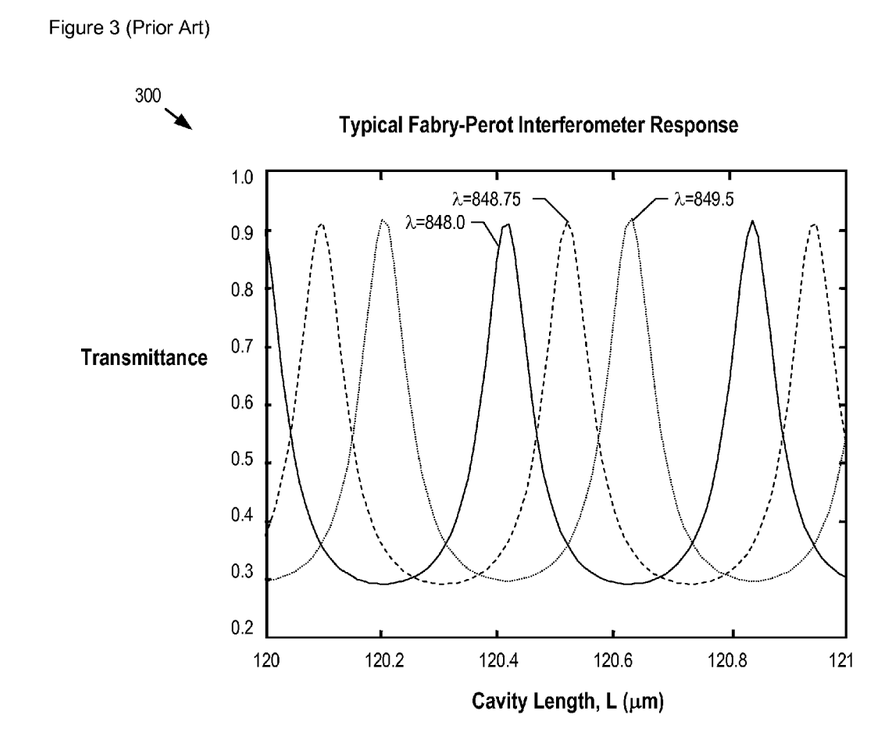
FIG. 3 depicts a plot of the transmittance of a beamsplitter with respect to cavity-length, L, and wavelength, $\lambda$, for an optical input beam at normal incidence, as in known in the prior-art.

FIG. 3 depicts a plot of the transmittance of a beamsplitter, specifically a Fabry-Perot interferometer, with respect to cavity-length, L, and wavelength, $\lambda$, for an optical input beam at normal incidence, as is known in the prior-art. For an input beam that is normally-incident on the Fabry-Perot, the intra-cavity path length is the same as the cavity length. Transmittance is plotted for three different wavelengths, $\lambda=848$ nm, $\lambda=848.75$ nm, and $\lambda=849.5$ nm for a cavity-length range from 120 microns to 121 microns. As seen in FIG. 3, the transmittance of a Fabry-Perot interferometer is a function of both wavelength and cavity-length. The transmittance, therefore, can be changed from a minimum transmittance of approximately 10% to a maximum transmittance of approximately 70% through control of the wavelength of the incident light and/or the cavity-length of the Fabry-Perot interferometer.

For an input beam that is incident on the Fabry-Perot interferometer at an angle other than normal, the intra-cavity path length of the input beam is equal to $L/\cos(\theta_1)$, where $\theta_1$ is the angle of deviation from normal incidence, as shown below and with respect to FIG. 4.

In prior-art displacement sensor 102, detector 212 and detector 216 are on opposite sides of beamsplitter 208. This configuration has high packaging complexity and cost, since signal routing, optical alignments, heating sinking, etc., are all difficult due to the arrangement of the components. The inventors recognized that the packaging complexity of the displacement sensor can be reduced by locating both detectors and the source on the same side of the displacement sensor. Further added advantage may be gained by mounting the two detectors, the source, and the processor on a single printed-circuit board.

In order to locate both detectors on the same side of the beamsplitter, either the reflected beam or transmitted beam must pass through the beamsplitter a second time. It is desirable that the second pass of the beam through the beamsplitter has little effect on the optical energy contained in the beam. The inventors further recognized that the transmissivity of a beamsplitter is dependent upon the intra-cavity path length of the beam transmitted, as discussed above and with respect to FIG. 3. As a result, the invention disclosed herein takes advantage of the fact that, for a particular wavelength of light, there is an intra-cavity path length that results in maximum transmittance for the beamsplitter. Therefore, a director is provided that redirects either the reflected beam or the transmitted beam back through the beamsplitter so that it transits the beamsplitter with substantially full transmittance. As used herein, the term "full transmittance" means substantially maximum transmittance for a particular beamsplitter at the wavelength of operation.

Figure 4:
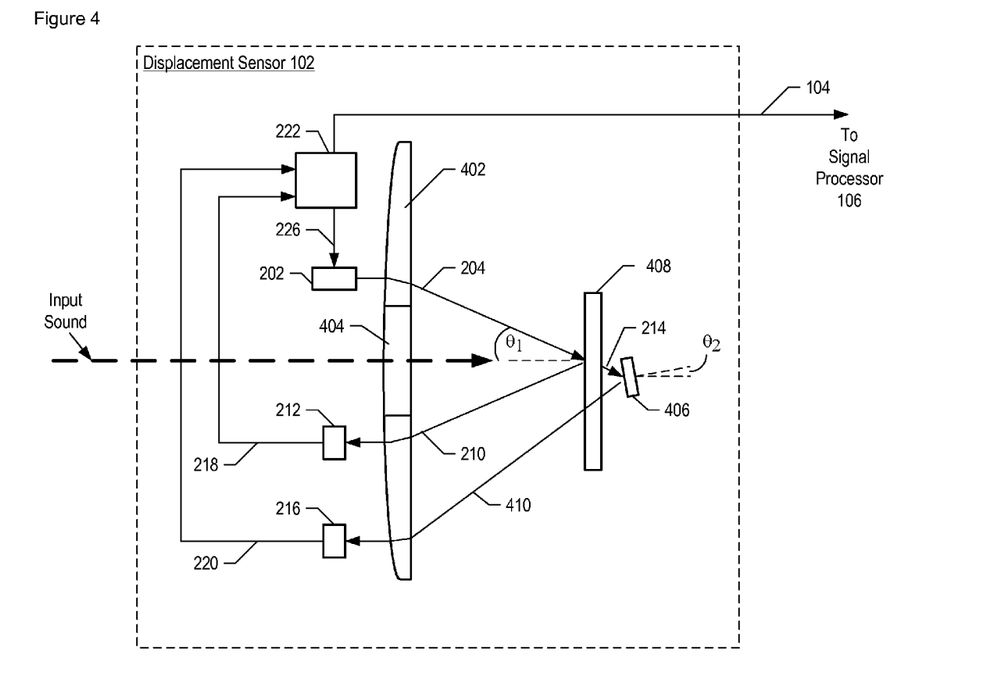
FIG. 4 depicts a schematic diagram of a displacement sensor in accordance with the illustrative embodiment of the present invention.

FIG. 4 depicts a schematic diagram of a displacement sensor in accordance with the illustrative embodiment of the present invention. Displacement sensor 102 comprises source 202, lens 402, beamsplitter 408, detectors 212 and 216, director 406, and processor 222.

Source 202 comprises a vertical-cavity surface-emitting laser (VCSEL), which emits input beam 204. Source 202 is described in detail above and with respect to FIG. 2.

In accordance with the illustrative embodiment, source 202 is tunable over the range of 830 nanometers (nm) to 860 nm. Operating wavelength $\lambda_1$ is a function of the drive current provided to the VCSEL; therefore, $\lambda_1$ is controlled by controlling the drive current applied to source 202, as described in U.S. patent application Ser. No. 11/278,990, filed Apr. 7, 2006, which is incorporated by reference herein. In some alternative embodiments of the present invention, the tunable range of source 202 is other than 830-860 nm. In some alternative embodiments, source 202 comprises a tunable laser diode. In some alternative embodiments, source 202 comprises a light-emitting diode (LED) and a tunable narrow-pass-band optical filter. In some alternative embodiments, source 202 comprises a super-luminescent light-emitting diode and a tunable narrow-pass-band optical filter. In some alternative embodiments, source 202 is a fixed-wavelength source. It will be clear to those skilled in the art, after reading this specification, how to make and use source 202.

Lens 402 is a piano-convex lens that is suitable for collimating light emitted by source 202. Lens 402 optionally includes access-hole 404, which facilitates the propagation of acoustic energy toward beamsplitter 408. Lens 402 is aligned to source 202 such that the output of source 202 is received at a distance from the central axis of lens 402. Lens 402 collimates the output of source 202 into input beam 204 and directs input beam 204 toward the focal point of lens 402. Lens 402 also receives reflected beam 210 and beam 410 from beamsplitter 408, and focuses the optical energy of reflected beam 210 and beam 410 toward detectors 212 and 216, respectively. Lens 402 operates in similar fashion to lens 206, described above and with respect to FIG. 2. Lens 402, however, typically requires a larger clear aperture to accommodate both reflected beam 210 and beam 410 than is required for lens 206. It will be clear to those skilled in the art how to make and use lens 402.

In some alternative embodiments, lens 402 is not present. In some alternative embodiments, the input sound does not pass through lens 402. In some alternative embodiments, source 202 comprises a collimating lens and a non-orthogonal angle is formed by the direction of propagation of the output of source 202 and Fabry-Perot interferometer 408.

Although the illustrative embodiment comprises a displacement sensor wherein input sound is directed at the beamsplitter from the same side as the lens, it will be clear to those skilled in the art, after reading this specification, how to make and use alternative embodiments of the present invention wherein input sound is directed at the beamsplitter from other directions, such as, for example, from the side opposite the lens or from any angle with respect to either membrane surface.

Beamsplitter 408 receives input beam 204 and splits it into reflected beam 210 and transmitted beam 214. In accordance with the illustrative embodiment, beamsplitter 408 is a Fabry-Perot interferometer, which comprises two partially-reflective surfaces that are substantially parallel and physically separated from one another. The two surfaces define an optically-resonant cavity, which is characterized by a cavity-length. It will be clear to those skilled in the art, after reading this specification, how to make and use alternative embodiments of the present invention in which beamsplitter 408 is fabricated using another device, such as, for example and without limitation, variable optical attenuators, tunable filters, interference filters, and absorptive filters. Beamsplitter 408 is discussed in detail below and with respect to FIG. 5. In some alternative embodiments of the present invention, beamsplitter 408 comprises a fixed-transmissivity beamsplitter.

Director 406 is a mirror that receives transmitted beam 214 and directs at least a portion of the optical energy of beam 214 back into beamsplitter 408 as beam 410. The angle, $\theta_2$, of director 406, with respect to the direction of propagation of transmitted beam 214 and beamsplitter 408, determines the intra-cavity path length of beam 410 within beamsplitter 408. Director 406 is set at an angle to cause beam 410 to have an intra-cavity path length substantially equal to $\lambda_1/4$ within beamsplitter 408, in the absence of input sound. Since full transmissivity of beam 410 through beamsplitter 408 is achieved for an intra-cavity path length equal to any $m\lambda_1/4$, where m is an odd integer, in some alternative embodiments, $\theta_2$ is set at an angle that results in beam 410 having one of these intra-cavity path lengths.

In some embodiments, director 406 is located on or in one of the two surfaces that compose the optically-resonant cavity. In these embodiments, intra-cavity path length means "effective intra-cavity path length," which takes into account the topography of director 406. In similar fashion, cavity-length means "effective cavity-length," which takes into account the topography of director 406.

In some alternative embodiments, director 406 and source 202 are located on the same side of beamsplitter 408, and detectors 212 and 216 are located on the opposite side of beamsplitter 408 from source 202. In these embodiments, at least a portion of reflected beam 210 is directed into beamsplitter 408 by director 406 at an angle that enables full transmittance through the beamsplitter.

Although in the illustrative embodiment director 406 is a mirror, it will be clear to those skilled in the art, after reading this specification, how to make and use alternative embodiments of the present invention wherein director 406 comprises a different optical element. Optical elements suitable for use in director 406 include, without limitation, prisms, diffraction gratings, holograms, corner reflectors, photonic bandgap materials, and wedges.

Detectors 212 and 216 are photodetectors suitable to detect the light output by source 202. Detectors 212 and 216 generate electrical signals 218 and 220, respectively, which are based on the intensity of the light that is incident on each detector. Electrical signals 218 and 220 are received by processor 222. Detectors 212 and 216 are described in more detail above and with respect to FIG. 2.

Although the present invention utilizes two detectors that detect both reflected beam 210 and beam 410, it will be clear to those skilled in the art, after reading this specification, how to make and use alternative embodiments of the present invention that utilize a single detector that detects only beam 410.

Processor 222 is a general-purpose processor that is capable of reading data and instructions from a memory, of executing instructions, of writing data to a memory, of receiving data from detectors 212 and 216, and of providing sensor signal 104 to signal processor 106. Processor 222 is described in more detail above and with respect to FIG. 2.

Figure 5:
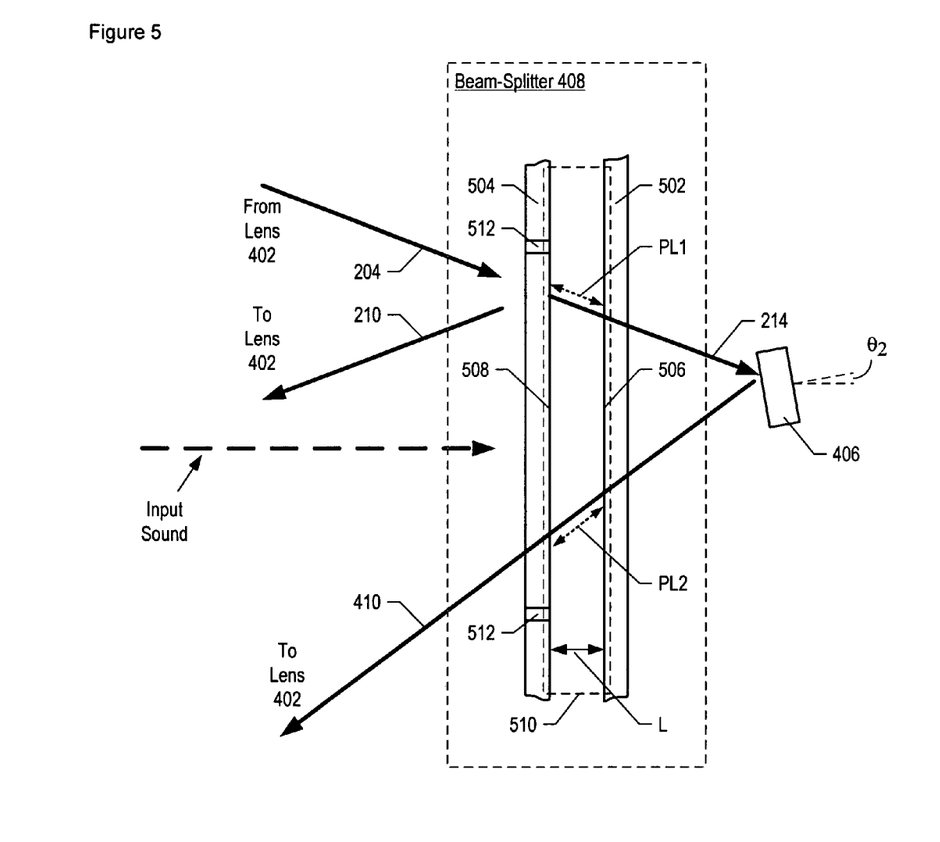
FIG. 5 depicts a schematic diagram of an arrangement of a beamsplitter and director in accordance with the illustrative embodiment of the present invention.

FIG. 5 depicts a schematic diagram of an arrangement of a beamsplitter and director in accordance with the illustrative embodiment of the present invention.

Beamsplitter 408 comprises membranes 502 and 504, which comprise surfaces 506 and 508, respectively. The thickness of each of membranes 502 and 504 is equal to $\lambda_1/4$, where $\lambda_1$ is the wavelength of light within the membrane material. Surfaces 506 and 508 are separated by cavity-length, L, and together compose optically-resonant cavity 510. Optically-resonant cavity 510 forms a Fabry-Perot interferometer. Membrane 502 is disposed on a first substrate, a portion of which is removed to form membrane 502. Membrane 504 is disposed on a second substrate, a portion of which is removed to form membrane 504 (first and second substrate are not shown for clarity). By virtue of the removed portion of their respective substrates, membranes 502 and 504 are able to move in response to incident acoustic energy. Membrane 504 includes holes 512, which enable beamsplitter 408 to adapt to changes in pressure (e.g., in order to provide or avoid mechanical damping effects, etc.). It will be clear to those skilled in the art, after reading this specification, how to make and use alternative embodiments of the present invention in which the thickness of membranes 502 and 504 are other than $\lambda_1/4$, such as, for example and without limitation, thicknesses substantially equal to $m\lambda_1/4$, where m is an odd integer.

In the illustrative embodiment, L is set to set-point cavity length, $L_o$, so as to provide equal amounts of optical energy in reflected beam 210 and transmitted beam 214 in the absence of environmental stimulus (i.e., input sound). As used herein, "set-point cavity length" means the cavity-length of an optically-resonant cavity in the absence of environmental stimulus. Transmitted beam 214 transits optically-resonant cavity 510 with an intra-cavity path length of PL1. Director 406 is set at an angle, $\theta_2$, such that beam 410 transits optically-resonant cavity 510 with intra-cavity path length, PL2. In the absence of environmental stimulus (i.e., when $L=L_o$), $PL2=PL2_o$, which is substantially equal to $\lambda_1/4$ so that beam 410 transits optically-resonant cavity 510 with full transmittance. In some alternative embodiments, $PL2_o$ is made equal to an intra-cavity path length other than $\lambda_1/4$ so that beam 410 transits optically-resonant cavity 510 with a transmittance other than full transmittance. In some alternative embodiments, $PL2_o$ is made substantially equal to $m\lambda_1/4$, where m is an odd integer. In some alternative embodiments, set-point cavity-length, $L_o$, is adjustable for tuning PL1 and PL2. Although in the illustrative embodiment $PL2_o$ is adjusted by controlling $\theta_2$, it will be clear to those skilled in the art, after reading this specification, how to make and use alternative embodiments of the present invention wherein $PL2_o$ is adjusted by controlling:

i. operating wavelength, $\lambda_1$; or
ii. input beam incidence angle, $\theta_1$; or
iii. mirror angle, $\theta_2$; or
iv. set-point cavity length, $L_o$; or
any combination of (i), (ii), (iii), and (iv).

It will be apparent to those skilled in the art that in some cases multiple additional beams are created by the interaction of beam 410 and optically-resonant cavity 510. This can occur, for example, when optically-resonant cavity 510 does not transmit beam 410 with 100% transmissivity. It will be clear to those skilled in the art, after reading this specification, how to make and use alternative embodiments of the present invention wherein detector 216 is designed to detect a plurality of beams that transit optically-resonant cavity 510. Additionally, it will be clear those skilled in the art, after reading this specification, how to make and use alternative embodiments wherein detector 216 comprises a plurality of detector regions that individually detect each of a plurality of beams that transit optically-resonant cavity 510.

Figure 6:
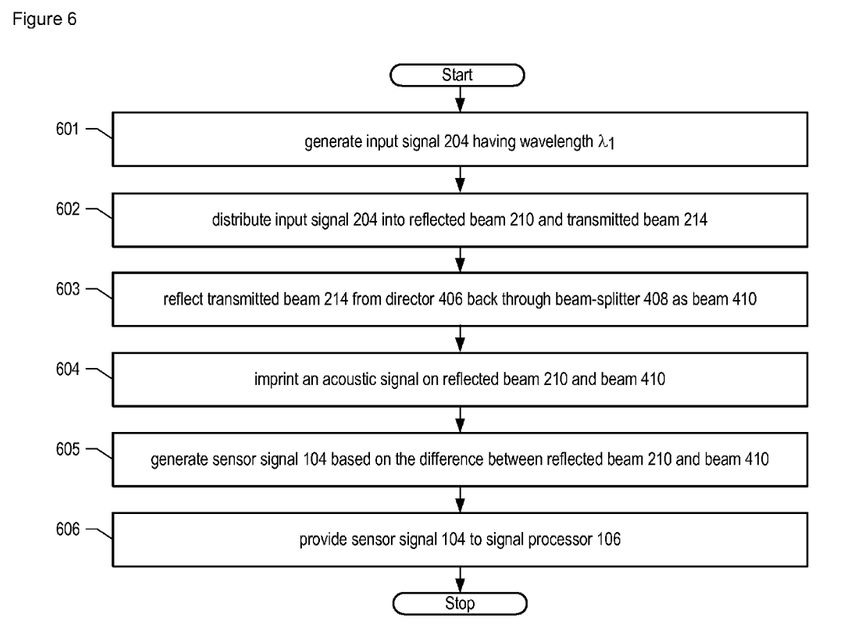
FIG. 6 depicts the salient operations of a method of microphone operation in accordance with the illustrative embodiment of the present invention.

FIG. 6 depicts the salient operations of a method of microphone operation in accordance with the illustrative embodiment of the present invention. In order to more clearly demonstrate the present invention, method 600 is described here, with reference to FIGS. 4 and 5.

At operation 601, source 202 generates input signal 204, which includes wavelength $\lambda_1$ ($\lambda_1$ is typically the center wavelength of signal 204).

At operation 602, input signal 204 is distributed into reflected beam 210 and transmitted beam 214 by beamsplitter 408, in the absence of input sound.

At operation 603, director 406 reflects transmitted beam 214 back into beamsplitter 408. Director 406 is tilted to angle $\theta_2$ to adjust PL2 to be substantially equal to $\lambda_1/4$.

At operation 604, acoustic energy is directed at beamsplitter 408. The acoustic energy causes membrane 504 to move, which thereby changes the separation between surface 506 and 508 as a function of the acoustic energy. As a result, the distribution of optical energy in beams 210 and 214 varies as a function of the acoustic energy, and thus an environmental signal is imprinted on reflected beam 210 and beam 410.

At operation 605, detector 212 receives reflected beam 210 and converts its optical energy into electrical signal 218. In addition, detector 216 receives beam 410 and converts its optical energy into electrical signal 220. Processor 222 receives electrical signals 218 and 220 and generates output signal 104. Output signal 104 is a function of electrical signals 218 and 220.

At operation 606, processor 222 provides output signal 104 to signal processor 106.

Figure 7:
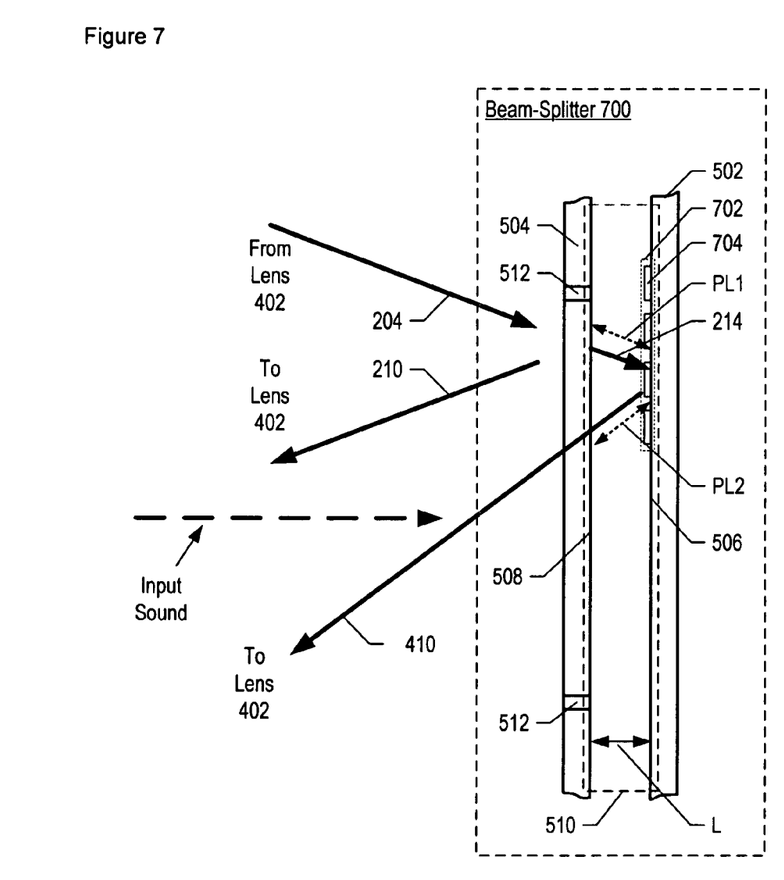
FIG. 7 depicts the salient operations of a beamsplitter in accordance with an alternative embodiment of the present invention.

FIG. 7 depicts the salient operations of a beamsplitter in accordance with an alternative embodiment of the present invention. Beamsplitter 700 comprises membranes 502 and 504, which comprise surfaces 506 and 508, respectively. Beamsplitter 700 is analogous to beamsplitter 500; however, in beamsplitter 700, surface 506 comprises director 702. Director 702 is a diffraction grating for reflecting at least a portion of transmitted beam 214 as beam 410. Director 702 comprises grating elements 704. In some embodiments, the size and spacing of grating elements 704 enables the reflection of beam 410 at an angle such that its intra-cavity path length, PL2, results in full transmittance in the absence of an environmental stimulus.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. An apparatus comprising:
a beamsplitter having a cavity, wherein said beamsplitter receives optical energy and distributes it into a first beam and a second beam, and wherein said second beam transits said beamsplitter on a first path that has a first intra-cavity path length;
a director, wherein said director receives one of said first beam and said second beam and provides a third beam, wherein said third beam comprises at least a portion of the optical energy of the received one of said first beam and second beam, and wherein at least a portion of said third beam transits said cavity on a second path having a second intra-cavity path length, and further wherein the first path and the second path are different paths;
a first detector, wherein said first detector generates an electrical signal based on the other one of said first beam and said second beam; and
a second detector, wherein said second detector generates an electrical signal based on said third beam;
wherein said beamsplitter is physically adapted to modulate a signal onto said third beam, and wherein said signal is based on an environmental stimulus.

2. The apparatus of claim 1 wherein said beamsplitter comprises a first surface and a second surface, and wherein said physical-adaptation comprises at least one of said first surface and said second surface being movable in response to said environmental stimulus.

3. The apparatus of claim 1 wherein said second intra-cavity path length enables substantially attenuation-free transmission of said third beam through said beamsplitter in the absence of said environmental stimulus.

4. The apparatus of claim 1 wherein said optical energy is characterized by a wavelength, $\lambda$, and wherein said second intra-cavity path length is substantially equal to $m*\lambda/4$, wherein m is an odd-integer, in the absence of said environmental stimulus.

5. The apparatus of claim 1 further comprising a source of said optical energy, wherein said optical energy is characterized by a wavelength, and wherein said source is wavelength-tunable.

6. The apparatus of claim 2 wherein one of said first surface and said second surface comprises said director.

7. The apparatus of claim 1 wherein said first detector and said second detector are collocated on the same substrate.

8. An apparatus comprising:
an element having a cavity length, wherein said element receives a first beam of optical energy and provides a second beam of optical energy, wherein said second beam comprises at least a portion of the optical energy of said first beam, and wherein the ratio of optical energy in said first beam and said second beam is a function of said cavity length, and further wherein said element comprises a physical adaptation that enables said cavity length to vary in response to an environmental stimulus; and
a director, wherein said director receives said second beam on a first path and provides a third beam to said element on a second path, wherein said third beam comprises at least a portion of the optical energy of said second beam, and wherein said element transmits said third beam with substantially full transmittance in the absence of said environmental stimulus, and further wherein said first path and said second path are different paths.

9. The apparatus of claim 8 wherein said physical adaptation comprises a first surface and a second surface, wherein said first surface and said second surface form an optically-resonant cavity, and wherein at least one of said first surface and said second surface is movable in response to said environmental stimulus.

10. The apparatus of claim 8 further comprising a first detector for generating a first electrical signal based on the intensity of said third beam.

11. The apparatus of claim 10 further comprising a second detector for generating an electrical signal based on the intensity of a fourth beam of optical energy, wherein said element provides said fourth beam, and wherein said fourth beam comprises at least a portion of the optical energy of the first beam, and further wherein the ratio of optical energy in said fourth beam and said first beam is a function of said environmental stimulus.

12. The apparatus of claim 8 further comprising a source of said optical energy, wherein said optical energy is characterized by a wavelength, and wherein said source is wavelength-tunable.

13. The apparatus of claim 8 wherein said environmental stimulus comprises acoustic energy.

14. The apparatus of claim 8 wherein said environmental stimulus comprises acoustic energy.

15. An apparatus comprising:
a first surface;
a second surface, wherein said first surface and said second surface are substantially parallel and form an optical cavity having a cavity-length, L, and wherein the second surface is physically adapted to move in response to an environmental stimulus; and
a director, wherein said director receives a first beam of optical energy from said optical cavity on a first path and provides a second beam to said optical cavity on a second path that is different from the first path, wherein said second beam comprises at least a portion of the optical energy of said first beam, and further wherein said director provides said second beam to said optical cavity such that said second beam transits said optical cavity with substantially full transmittance.

16. The apparatus of claim 15 wherein said second beam transits said optical cavity with substantially full transmittance when said cavity-length, L, is equal to a set-point cavity-length, $L_o$.

17. The apparatus of claim 15 further comprising a source said optical energy, wherein said source provides an input beam of optical energy to said optical cavity, and wherein said first beam comprises at least a portion of said input beam.

18. The apparatus of claim 17 wherein said optical energy is characterized by a wavelength, and wherein said source is wavelength-tunable.

19. The apparatus of claim 15 wherein said environmental stimulus comprises acoustic energy.

20. The apparatus of claim 15 wherein said environmental stimulus comprises an acceleration of at least one of said first surface and said second surface.

21. A method comprising:
provide an optical cavity having a cavity length, L, wherein L is based on an environmental stimulus;
receiving an input beam of optical energy at said optical cavity, wherein said optical cavity distributes said input beam into a first beam on a first path and a second beam on a second path, and wherein the ratio of optical energy in the first beam and the second beam is based on said cavity length, L;
receiving said first beam at a director that provides a third beam that comprises at least a portion of the optical energy of said first beam;
directing said third beam to said optical cavity on a third path that is different from the first path, wherein said optical cavity transmits said third beam with substantially full transmittance when said cavity-length, L, is equal to a set-point cavity-length, $L_o$; and
imprinting an environmental signal on said first beam and said second beam, wherein said environmental signal is imprinted by said optical cavity in response to an environmental stimulus.

22. The method of claim 21 further comprising receiving said second beam from the optical cavity, wherein said second beam is received at a first photodetector that generates a first electrical signal that is based on the optical energy of said second beam.

23. The method of claim 22 further comprising:
receiving said third beam from the optical cavity, wherein said third beam is received at a second photodetector that generates a second electrical signal that is based on the optical energy of said third beam; and
generating a third electrical signal, wherein said third electrical signal is based on said first electrical signal and said second electrical signal.

24. The method of claim 21 further comprising:
generating said input beam of optical energy, wherein said optical energy is characterized by a wavelength, $\lambda$, and wherein said optical energy is generated by a source that is wavelength-tunable; and
wavelength-tuning said source such that said optical cavity transmits said second beam with substantially full transmittance when said cavity-length, L, is equal to said set-point cavity-length, $L_o$.

25. The method of claim 21 wherein said third beam is provided to said optical cavity such that said third beam transits said cavity with an intracavity path length substantially equal to $m*\lambda/4$, where m is an odd-integer, when said cavity-length, L, is equal to said set-point cavity-length, $L_o$.

* * * * *